Patented Sept. 30, 1924.

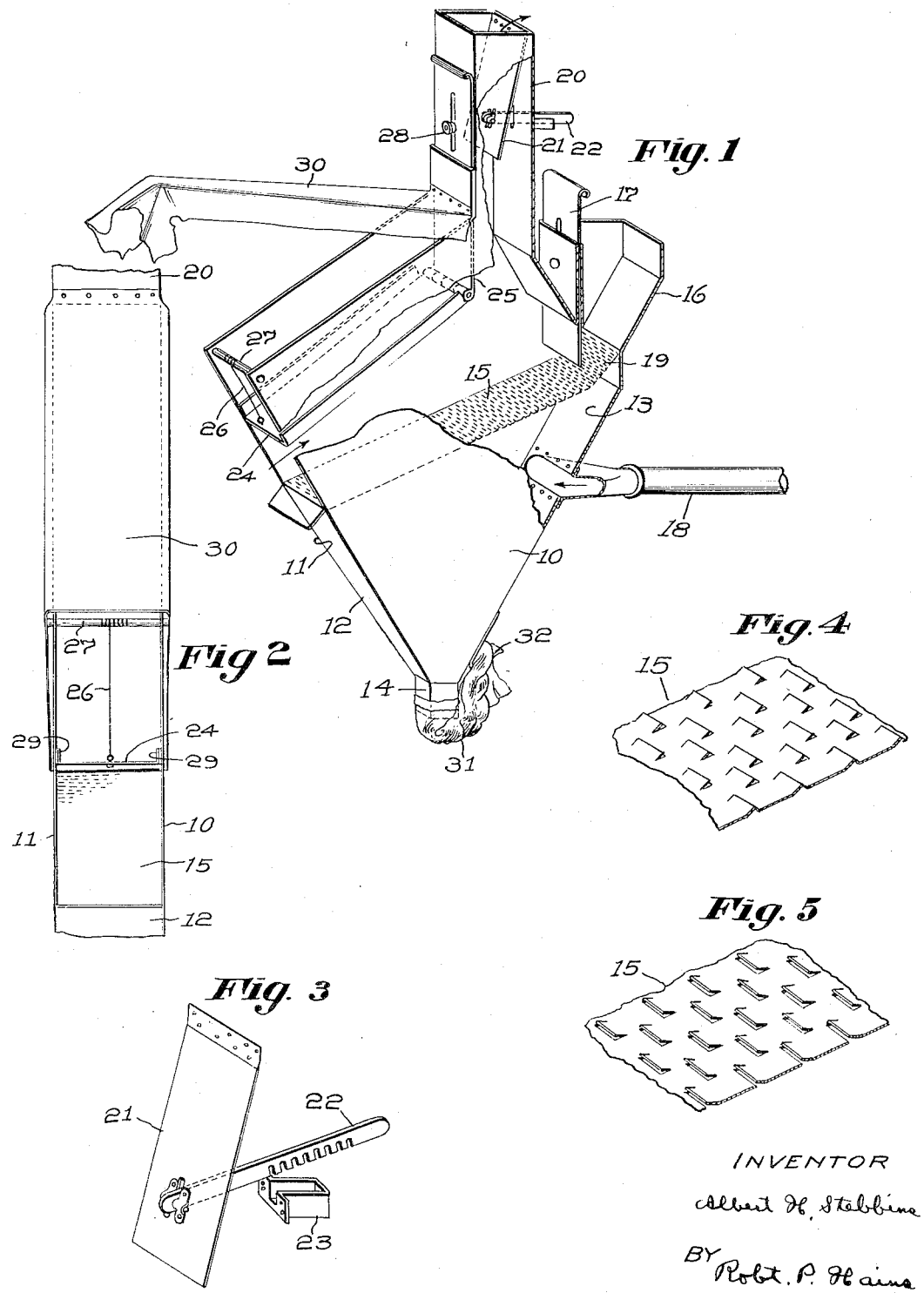

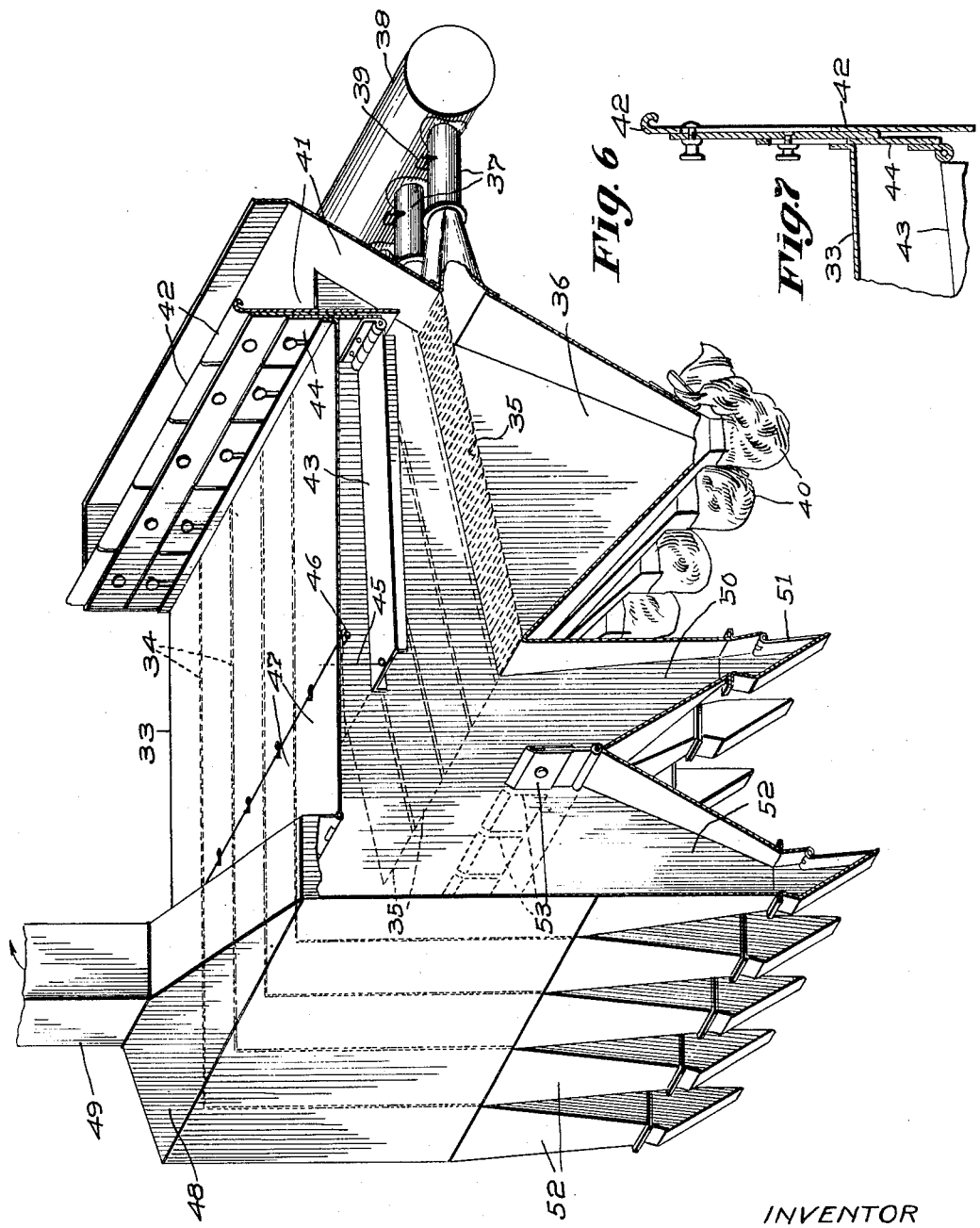

1,509,913

UNITED STATES PATENT OFFICE.

ALBERT H. STEBBINS, OF LOS ANGELES, CALIFORNIA.

DUST EXTRACTOR.

Application filed July 3, 1922. Serial No. 572,375.

*To all whom it may concern:*

Be it known that I, ALBERT H. STEBBINS, a citizen of the United States, residing at Los Angeles, in the county of Los Angeles and State of California, have invented an Improvement in Dust Extractors, of which the following description, in connection with the accompanying drawings, is a specification, like characters on the drawings representing like parts.

This invention relates to a dust extractor for removing dust and fine particles from small lumps of coal and other materials.

It is frequently desirable to cleanse various materials of the accompanying dust and fine particles, and this may be done by passing air through the materials to be treated to carry off the dust from the larger particles. It is important, however, that the materials being treated be thoroughly subjected to the action of the air that the dust may be completely removed, and it is also important that the strength of the air be controlled so that it will remove the dust but will not carry off the larger materials.

One of the important features of the present invention, therefore, resides in a dust extractor having a perforated surface upon which the materials to be treated are delivered, and having a cover that is mounted for adjustment toward and from the perforated surface to vary the size of the separating chamber above the perforated surface.

Another feature of the invention resides in a dust extractor, having a chamber in which the materials to be treated are subjected to the action of the air, and having a settling chamber positioned between the first chamber and the exit for the dust laden air.

Other features of the invention and novel combination of parts in addition to the above will be hereinafter described in connection with the accompanying drawings which illustrate one good practical form thereof.

In the drawings:

Fig. 1 is a perspective view of a dust extractor constructed in accordance with the present invention;

Fig. 2 is an enlarged rear view of part of the dust extractor of Fig. 1;

Fig. 3 is a perspective view of air control means to be described;

Figs. 4 and 5 are perspective views of perforated surfaces;

Fig. 6 is a perspective view of a modification showing a number of dust extractors formed side by side; and Fig. 7 is a vertical sectional view through parts shown in Fig. 6.

In the embodiment of the invention shown in Figs. 1 and 2, a casing is provided conveniently formed of sheet metal and having the spaced side walls 10 and 11 connected by end walls 12 and 13. The lower portion of the casing preferably tapers downwardly as shown to direct materials into the discharge spout 14 at the lower end thereof.

Within the casing is mounted a perforated surface 15 that extends across the casing from one wall thereof to another, and in the present case the surface is mounted at an inclination to promote travel of materials longitudinally thereof. The materials to be treated may be delivered to the upper end of the perforated surface by a hopper 16 supported by the casing, and the flow of materials from the hopper to the perforated surface may be controlled by an adjustable gate 17.

Air is caused to pass upwardly through the materials that are delivered to the perforated surface 15 and to this end, in the present case, air is forced into the lower portion of the casing through a pipe 18, and escapes from this portion of the casing by passing upwardly through the perforations within the plate 15. The perforated plate 15 preferably is relatively narrow in width as compared to its length, since it is difficult to secure uniform action of the air upon the materials if a comparatively wide perforated plate is used, and the distance between the walls 10 and 11 is made to conform to the width of the perforated plate. A portion of the perforated plate 15 preferably extends under the hopper 16 and is bent upwardly as at 19 to direct air into the lower portion of the hopper so that jets of air will be forced into the hopper in a direction to promote flow of materials from the hopper. In this manner danger of the materials becoming clogged at the discharge opening of the hopper is avoided.

The air passing upwardly through the perforated surface 15 will carry different materials upwardly therefrom to different heights and the lightest materials will be thrown upwardly the greatest distance from the surface 15. In accordance with the present invention the materials that are thrown upwardly from the surface 15 the greatest distance may be carried off by providing a conduit 20 having suction produced therein to remove air and the lighter particles from the casing. The conduit 20 may have a gate 21 therein that is adjustable transversely of the conduit to vary the passage of air therethrough, and this gate may be secured in the desired position of adjustment by a notched bar 22, the notches of which may engage the rear wall of a bracket 23 secured to the outer wall of the conduit.

As stated, the air passing upwardly through the perforated surface 15 will carry different materials upwardly to different heights and the proportion of the materials treated that will be carried off by the air passing through the conduit 20 may be varied by providing a cover 24 mounted between the side walls 10 and 11 for adjustment toward and from the surface 15. In the present case one end of the cover 24 is hinged to a plate 25 secured to the conduit 20 for sliding adjustment, and the other end of the cover 24 is supported in the desired position of adjustment by a cord 26 secured to a transversely extending rod 27. The plate 25 may be secured in the desired position of adjustment by a nut 28, and the cover 24 may have upwardly bent side portions 29 that engage the sides 10 and 11 of the casing. A canvas cover 30 may be secured at its upper end to the casing so that it will extend over that portion of the casing in which the adjustable cover 24 is mounted.

The perforations within the surface 15 preferably are small in the construction shown in Fig. 1 so that a comparatively small amount of air will pass through this surface, but the small currents of air passing through these perforations are directed against the materials with considerable force. The suction within the conduit 20 may therefore serve to remove the air that passes through the perforated surface 15, and may also draw some air into the casing at the delivery end of the surface 15. This will produce a current of air passing between the cover 24 and surface 15 toward the conduit which will carry with it the lighter materials. The coarseness of the materials that are carried up the conduit 20 by the air will vary with the adjustment of the cover 24 and if the cover is supported well above the surface 15 only very fine materials will be removed, and if the cover is moved downwardly toward the different layers of materials suspended in the air, materials of increasing coarseness will be carried off by the air moving toward the conduit.

The perforated surface 15 may be constructed as shown in Figs. 4 and 5 and the perforations may be directed upwardly as in Fig. 4 or may be directed downwardly as in Fig. 5. When the perforations are directed upwardly it is necessary to support the perforated surface at a comparatively steep inclination to promote travel of the materials along the same.

A small proportion of the materials being treated may fall through the perforations in the surface 15. These materials will travel downward into the spout 14 and may be caught in a bag 31 which is normally twisted around a hook 32 as shown to close the spout 14. The larger and heavier materials upon the surface 15 travel lengthwise of the inclined surface and are discharged from the end thereof free from dust.

The modified construction shown in Fig. 6 is designed so that all the air used to carry off the lighter materials passes upward through the perforated surface, and a number of dust extractors are shown as positioned side by side to provide a unit of the desired capacity.

In this figure a relatively large casing 33 is shown as divided by spaced walls 34 into separate dust extractors each of which has a perforated surface 35 mounted therein so that it slopes downwardly toward the discharge end as shown. Air under pressure is delivered to the chambers 36 below the perforated surfaces 35 by pipes 37 leading from a main pipe 38, and the supply of air delivered by each pipe 37 may be controlled by the gates 39. The lower ends of the chamber 36 are closed by bags 40, the same as in Fig. 1.

The materials to be treated are delivered to the perforated surfaces 35 by hoppers 41 and the flow of the materials from the hoppers may be controlled by adjustable gates 42. A cover 43 is mounted in each dust extractor above the perforated surface 35 for adjustment toward and from the surface, the same as in Fig. 1. These covers 43 are hinged to downwardly extending plates 44 adjustably secured to a wall of the hoppers 41, and the other ends of the covers 43 are supported by cords 45 secured to transverse rods 46. Access to the cords 45 may be had by opening the hinged doors 47 of the casing 33.

In the construction shown in Fig. 6 a suction chamber 48 is formed at the rear of the casing 33 and a conduit 49 leads from the suction chamber. The dividing walls 34 may extend rearwardly into the chamber 48 to prevent the materials treated in the different dust extractors from intermingling, and the air that passes upwardly through the surfaces 35 moves rearwardly into the suction chamber 48. The heavier materials discharged from the end of the perforated surfaces 35 fall into hoppers 50 closed at their lower ends by trap doors 51, and some of the lighter materials carried by the air may fall into the settling chambers 52 extending downwardly from the suction chamber 48. A partition 53 may be mounted between the chambers 51 and 52 for swinging adjustment toward and from the end of the perforated surface 35 to direct materials into either of these chambers. The proportion of the material removed by the air drawn upwardly into the conduit 49 may be controlled by adjusting the cover 45 toward or from the perforated surface 35 the same as described in connection with Fig. 1, and the settling chamber 52 serves to collect the heavier particles that are carried by the air into the chamber 48.

What is claimed is:

1. A dust extractor, comprising in combination, a casing having an apertured surface extending across the casing, a cover supported in spaced relation to said surface to provide an air passage between the cover and surface which passage has an open end, a conduit leading from the opposite end of said passage for drawing air into the passage through its open end to travel lengthwise of the passage, a hopper for delivering materials to the surface, means for forcing jets of air upwardly through the apertures of the surface to carry different particles of material upwardly into the passage to different degrees so that the light particles will be completely removed from the heavier particles and carried off by the air introduced through said end and traveling lengthwise of the passage, and means for supporting the cover in different positions of adjustment relative to the apertured surface to vary the area of said passage and the action of the air passing therethrough upon the materials lifted by the jets of air.

2. A dust extractor, comprising in combination, a casing having an apertured surface extending across the casing, a cover supported in spaced relation to said surface to provide an air passage between the cover and surface, means for drawing air into the passage through an end thereof to travel lengthwise of the passage, a hopper for delivering materials to the surface, means for forcing jets of air upwardly through the apertures of the surface to carry different particles of material upwardly into the passage to different degrees so that the lighter particles will be completely removed from the heavier particles and carried off by the air introduced through said end and traveling lengthwise of the passage, and means for supporting the cover in different positions of adjustment relative to the apertured surface to vary the area of said passage and the action of the air passing therethrough upon the materials lifted by the jets of air.

3. A dust extractor, comprising in combination, a casing having an apertured surface extending across the casing, a cover supported in spaced relation to said surface to provide an air passage between the cover and surface which passage has an air entrance at one end, means for producing a flow of air through said entrance and lengthwise of the passage, a hopper for delivering materials to the surface, means for forcing jets of air upwardly through the apertures of the surface to carry different size materials upwardly within the passage to different heights so that the lighter particles will be completely removed from the heavier particles and carried off by said flow of air lengthwise of the passage, and means for supporting the cover for adjustment bodily toward and from the apertured surface to vary the area of the passage and the action of the air passing therethrough upon the materials lifted by the jets of air.

4. In a device of the class described, a casing having a perforated surface extending across the same, means for forcing air upwardly through the surface, a hopper for delivering materials to be treated to the surface and so positioned over a portion of the perforated surface that air may pass through the perforations of the portion of the surface below the hopper into the lower portion of the hopper to promote feeding of the materials therefrom, and a conduit leading from the portion of the casing above the perforated surface to conduct air and the lighter particles from the casing.

5. A dust extractor, comprising in combination, a casing having an apertured surface extending across the same, a cover supported in spaced relation to said surface to provide an air passage between the cover and surface, a conduit leading from said passage and adapted to suck air from the casing, means for delivering materials to the apertured surface, means for passing air upwardly through the surface for lifting the lighter materials into the passage, an adjustable extension forming a continuation of a wall of the conduit and projecting downwardly within said casing, and the cover being secured to said extension and adjustable thereby to vary the distance between the cover and perforated surface.

In testimony whereof, I have signed my name to this specification.

ALBERT H. STEBBINS.